(12) United States Patent
Morrow et al.

(10) Patent No.: US 7,078,011 B2
(45) Date of Patent: Jul. 18, 2006

(54) METHOD OF STORING AND SUPPLYING HYDROGEN TO A PIPELINE

(75) Inventors: Jeffrey M. Morrow, Buffalo, NY (US); Marianne Corrao, The Woodlands, TX (US); Steven Hylkema, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 41 days.

(21) Appl. No.: 10/812,084

(22) Filed: Mar. 30, 2004

(65) Prior Publication Data
US 2005/0220704 A1   Oct. 6, 2005

(51) Int. Cl.
*C01B 3/02* (2006.01)
(52) U.S. Cl. .................. 423/648.1; 95/139; 423/220; 423/230; 423/652
(58) Field of Classification Search ............ 423/220, 423/648.1, 652, 230; 95/139
See application file for complete search history.

(56) References Cited

U.S. PATENT DOCUMENTS

| | | | | |
|---|---|---|---|---|
| 2,878,165 | A | | 3/1959 | Cottle .................. 202/39.5 |
| 4,025,321 | A | * | 5/1977 | Anderson et al. ........... 95/123 |
| 4,183,369 | A | * | 1/1980 | Thomas ................. 137/13 |
| 6,503,299 | B1 | | 1/2003 | Baksh et al. ............. 95/98 |
| 6,511,528 | B1 | * | 1/2003 | Lansbarkis et al. ......... 95/118 |
| 6,576,138 | B1 | | 6/2003 | Sateria et al. ............ 210/664 |
| 6,581,618 | B1 | | 6/2003 | Hill et al. ............... 137/1 |
| 2004/0123738 | A1 | * | 7/2004 | Spencer ................ 95/236 |

OTHER PUBLICATIONS

Gehle et al., "A Brief History of Salt Cavern Use", Keynote Speech at Salt 2000 conference (2000), no month.
Rezunenki et al., "Construction and Operation of Rock-Salt Underground Helium Concentrate Storage", SMRI Fall Meeting (1999), no month.
Mahoney et al., "Reduction of Sulfate by Hydrogen in Natural Systems: A Literature Review", Pacific Northwest Laboratory, Richland, VA (1988), no month.

* cited by examiner

*Primary Examiner*—Wayne A. Laugel
(74) *Attorney, Agent, or Firm*—David M. Rosenblum

(57) ABSTRACT

A method of storing and supplying a gaseous hydrogen product to a pipeline under a product purity specification in which a hydrogen stream made up of gaseous hydrogen is compressed to form a compressed hydrogen stream and introduced into a salt cavern for storage. A crude hydrogen stream, contaminated from storage in the salt cavern is recovered and purified by sufficiently removing at least carbon dioxide and water vapor to produce a hydrogen product stream having an impurity level at or below the product purity specification. The hydrogen product stream is supplied back to the pipeline. Alternatively, during periods of low demand, hydrogen produced by a production facility is both purified and supplied to the pipeline and stored in the salt cavern. During high demand period, both the output of the production facility and hydrogen retrieved from the salt cavern are purified and supplied to the pipeline.

8 Claims, 2 Drawing Sheets

METHOD OF STORING AND SUPPLYING HYDROGEN TO A PIPELINE

FIELD OF THE INVENTION

The present invention relates to a method of storing and supplying a gaseous hydrogen product to a pipeline in which gaseous hydrogen is stored in a salt cavern for later use. More particularly, the present invention relates to such a method in which gaseous hydrogen stored in the salt cavern is purified so that it can be supplied to the pipeline under a product purity specification.

BACKGROUND OF THE INVENTION

Hydrogen can be supplied to customers connected to a hydrogen pipeline. Typically, the hydrogen is manufactured by steam methane reforming in which a hydrocarbon and steam are reacted at high temperature in order to produce a synthesis gas containing hydrogen and carbon monoxide. Hydrogen is separated from the synthesis gas to produce a hydrogen product that is introduced into the pipeline for distribution to the customers. Alternatively, hydrogen can be recovered from a hydrogen rich stream.

Typically, hydrogen is supplied to customers under agreements that require availability and on stream times for the steam methane reformer or hydrogen recovery plant. When a steam methane reformer is taken off-line for unplanned or extended maintenance, the result could be a violation of such agreements. Additionally, there are times in which customer demand can exceed hydrogen production capacity of existing plants. A storage capacity for the pipeline hydrogen or a sufficient backup is therefore very desirable in connection with hydrogen pipeline operations. However, providing a backup for hydrogen supply practically requires a large volume of hydrogen to be stored in above ground gaseous storage receivers or liquid storage tanks. The construction costs involved make such a backup storage capacity impractical.

The problem is particularly exacerbated where the hydrogen is supplied under pipeline product specification that require a hydrogen purity typically above 95% and possibly of 99.99% for ultra high purity hydrogen. Practically speaking, considering that hydrogen production plants on average have production capacities that are roughly 50 million standard cubic feet per day, a storage capacity for hydrogen that would allow a plant to be taken off-line be in the order of 1 billion standard cubic feet.

Hydrogen as well as other gases have been stored in salt caverns. Salt caverns are large underground voids that are formed by solution mining of salt as brine. Caverns are common in gulf states of the United States where demand for hydrogen is particularly high. Such hydrogen storage has only taken place where there are no purity requirements placed upon the hydrogen product. As such, contamination of the hydrogen from being stored in a salt formation is an unknown variable.

As will be discussed, inventors herein have identified the problem of increased contamination of hydrogen storage in salt caverns and have remedied contamination in accordance with the present invention in order to allow hydrogen stored within salt cavern to be delivered to a pipeline when needed under product purity specifications.

SUMMARY OF THE INVENTION

The present invention provides a method of storing and supplying a gaseous hydrogen product to a pipeline under a product purity specification. In accordance with the method, a hydrogen stream made up of gaseous hydrogen is compressed to form a compressed hydrogen stream. The compressed hydrogen stream is introduced into a salt cavern for storage of the gaseous hydrogen. A crude hydrogen stream is recovered from the salt cavern and then purified by sufficiently removing at least carbon dioxide and water vapor from the crude hydrogen stream to at least in part produce a hydrogen product stream having an impurity level at or below the product purity specification. The gaseous hydrogen product is supplied to the pipeline by introducing the hydrogen product stream into the pipeline.

As will be discussed it has been found by the inventors herein that storage of hydrogen within salt formation produces unacceptably high levels of carbon dioxide and potentially other impurities in the hydrogen. Purification of the hydrogen stream from such impurities allows it to be delivered at any desired product specification.

The gaseous hydrogen can be produced by a hydrogen production facility, such as a steam methane reformer, that is configured to produce the gaseous hydrogen with a higher level of the carbon dioxide and water vapor than the product purity specification. Purification equipment is provided to purify the gaseous hydrogen to directly produce the hydrogen product stream and also to purify the crude hydrogen stream to produce the hydrogen product stream therefrom. When the demand for the gaseous hydrogen product is below a production capacity of the hydrogen plant, the hydrogen product stream is formed by directly purifying part of the gaseous hydrogen without recovery of the crude hydrogen stream from the salt cavern. The remaining part of the gaseous hydrogen is utilized as a hydrogen stream for compression and storage in the salt cavern. When demand for the gaseous product is above the production capability of the hydrogen plant, the crude hydrogen stream can be recovered from the salt cavern and purified to at least in part produce the product stream.

Alternatively, the hydrogen stream for storage can be directly removed from the pipeline and stored during periods of low demand for the hydrogen product. If the demand intensifies due to either a reduced production capability, for instance, a plant being taken off-line for maintenance or a high customer demand, the hydrogen product stream can be supplied from the salt cavern and introduced into the pipeline.

As mentioned above, other impurities may be present in a product specification such as hydrogen sulfide. In such case, water in a liquid state and other contaminants can be removed from the crude hydrogen stream within a coalescing filter. The hydrogen sulfide, water vapor and carbon dioxide can be removed from the crude hydrogen stream after the coalescing filter by adsorption. In such case the hydrogen sulfide is removed before the water vapor and carbon dioxide.

The hydrogen sulfide can be removed within a hydrogen sulfide adsorption bed to form an intermediate product stream. The intermediate product stream can be introduced into a system of adsorbent beds that are configured to remove the carbon dioxide and water in an alternating fashion such that one bed is on line producing the hydrogen product stream while another bed is off-line being regenerated through desorption. The system of adsorbent beds can be operated in accordance with the temperature swing adsorption cycle. A subsidiary hydrogen product stream can be divided out of the hydrogen product stream and heated. After heating the subsidiary hydrogen product stream can be introduced into the off-line adsorption bed, thereby to produce a regeneration stream containing desorbed impurities. Water can be separated from the regeneration stream and after water separation, the regeneration stream can be compressed and recycled back to the coalescing filter.

The hydrogen stream to be stored can be compressed to about 2200 psig and the hydrogen product stream to be supplied to the pipeline can be reduced in pressure to between about 600 psig and about 800 psig. The hydrogen purity product specification can be about 99.99% pure hydrogen that contains less than about 100 ppmv of nitrogen and argon, less than 1 ppmv of carbon monoxide and carbon dioxide, less than 1 ppmv of methane, less than 1 ppmv of water and less than about 1 ppmv of hydrogen sulfide.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
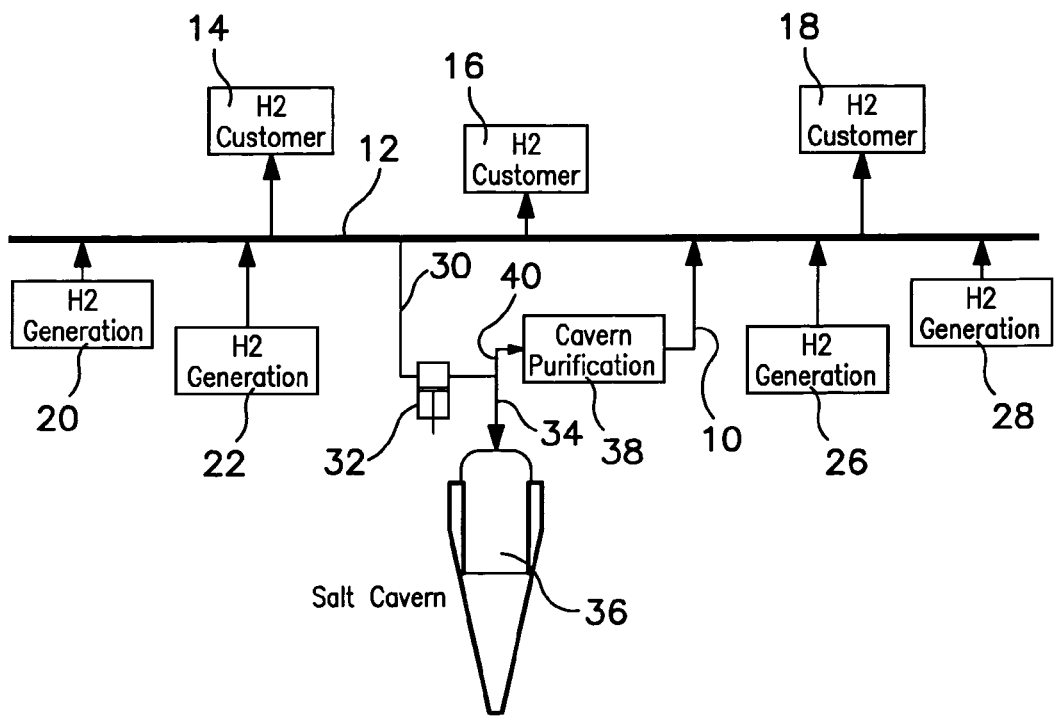
FIG. 1 is a schematic illustration of a process flow diagram illustrating the flow of various hydrogen streams in connection with an apparatus carrying out a method in accordance with the present invention.

With reference to FIG. 1, a gaseous hydrogen product stream 10 is introduced into a pipeline 12 for distribution of hydrogen to customers 14, 16 and 18. Hydrogen is supplied to pipeline 12 by way of hydrogen generation facilities designated by reference numbers 20, 22, 26 and 28.

Hydrogen for such pipeline may have a product purity specification of 99.99 mol % hydrogen in which the hydrogen contains less than 100 ppmv of nitrogen and argon, less than 1 ppmv of carbon monoxide and carbon dioxide, and less than 1 ppmv of methane, water vapor and hydrogen sulfide. Such a pipeline would therefore be capable of supplying high purity hydrogen under the aforesaid product purity specification. It also is possible that the product specification might have a lower product purity specification in which higher levels of impurities such as hydrogen sulfide would be tolerated.

During periods of low demand by customers 14, 16 and 18 or at least during periods when excess production capacity of hydrogen generation facilities 20, 22, 26 and 28 exist, a gaseous hydrogen stream 30 is removed from a pipeline 12 and compressed to about 2200 psig by a cavern feed compressor 32 to produce a compressed hydrogen stream 34 that is stored within a salt cavern 36. When a hydrogen generation facility, such as that designated by reference number 20, is taken off-line for any reason or when demand for hydrogen by customers 14, 16 and 18 exceeds the available production capabilities, hydrogen is removed from salt cavern 36 as a crude hydrogen stream 40 and purified within purification system 38. The purification of crude hydrogen stream 40 produces hydrogen product stream 10 which is reintroduced into pipeline 12. Hydrogen product stream 10 may have a pressure of between about 600 psig and about 800 psig.

It is to be noted, that storage within salt cavern 36 can introduce carbon dioxide into the hydrogen due to equilibrium with dissolved $CO_2$. The brine has dissolved carbon dioxide which may off gas to the stored hydrogen. The stored gaseous hydrogen will be in contact with brine and therefore the level of moisture introduced into the stored hydrogen may be unacceptable. As mentioned above, carbon dioxide and water vapor may be the only significant impurities that could be effected by storage in the salt cavern 36 and other impurities within the product purity specification would be unchanged by such storage. Hydrogen sulfide may be a significant impurity in the product purity specification. However, it is not completely understood whether salt cavern storage would have an effect on such an impurity. However, cavern brine is an aqueous solution containing salt ions, including sulfates and carbonates. The high partial pressure of hydrogen within salt cavern 36 could reduce sulfate ions to hydrogen sulfide or bacterial activity could generate $H_2S$ and therefore storage of gaseous hydrogen within salt cavern 36 could result in an unacceptable level of hydrogen sulfide to be returned to pipeline 12.

As such, even though the hydrogen taken from pipeline 10 may be at high purity, after storage, the possibility exists that carbon dioxide and water vapor levels will rise to unacceptable high levels with respect to the product purity specification. The same possibility exists for hydrogen sulfide when applicable. Other impurities within the product purity specification will remain unaffected by storage.

Figure 2:
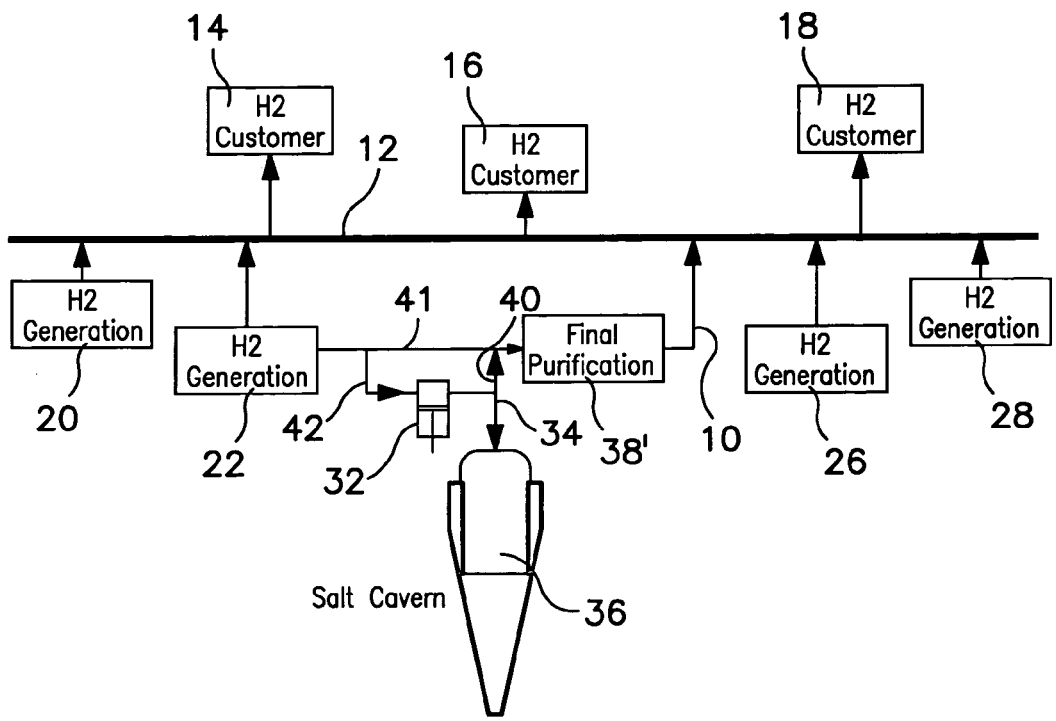
FIG. 2 is an alternative embodiment of a process flow diagram illustrating the flow of various hydrogen streams in connection with an apparatus for carrying out a method in accordance with the present invention.

With reference to FIG. 2, salt cavern 36 and a hydrogen production facility 22 can be placed in close proximity to one another. Hydrogen generation facility 22 contains a hydrogen plant to produce a gaseous hydrogen product with a higher impurity level of at least carbon dioxide and water vapor than is required for the product purity specification and possibly also and hydrogen sulfide if applicable. Other hydrogen generation facilities 20, 26 and 28 can be provided to supply gaseous hydrogen to pipeline 12 under product purity specifications requiring specific concentrations of impurities such as carbon dioxide, water and hydrogen sulfide. As such, the hydrogen generation facilities 20, 26 and 28 are provided with purification equipment to allow hydrogen to be supplied under the specification.

When excess hydrogen generation capacity exists, part of the gaseous hydrogen product, as a gaseous hydrogen stream 41, is introduced into an on-site, final purification system 38' to acceptably reduce carbon dioxide, water vapor and hydrogen sulfide levels to meet the product purity specification. Other purification equipment would be included within hydrogen production facility 22 to meet remaining component impurity requirements in the product specification. At such time, a remaining part of the gaseous hydrogen product, as a gaseous hydrogen stream 42, would be compressed by cavern feed compressor 32 and stored within salt cavern 36 by way of compressed hydrogen stream 34.

When demand of gaseous hydrogen product is above the production capacity along pipeline 12, crude hydrogen stream 40 is recovered from the salt cavern 36 and is combined with a gaseous hydrogen stream 41 to produce a combined stream that is sent to purification system 38' to form product stream 10. Hence, the purification system 38' functions both to purify the hydrogen from the hydrogen production facility 22, for instance, a steam methane reformer, and the hydrogen stored in salt cavern 36. As such, the hydrogen stored in salt cavern 36 is stored at low purity for later purification within purification system 38'.

The embodiment of FIG. 2 allows dual use for final purification system 38' to function for both hydrogen production facility 22 and hydrogen retrieved from salt cavern 36. This obviates the need to fabricate a separate purification facility dedicated to salt cavern 36. A further modification to such embodiment would be to couple hydrogen production facility 22 and salt cavern 36 to all purification used in connection with hydrogen production facility 22.

Figure 3:
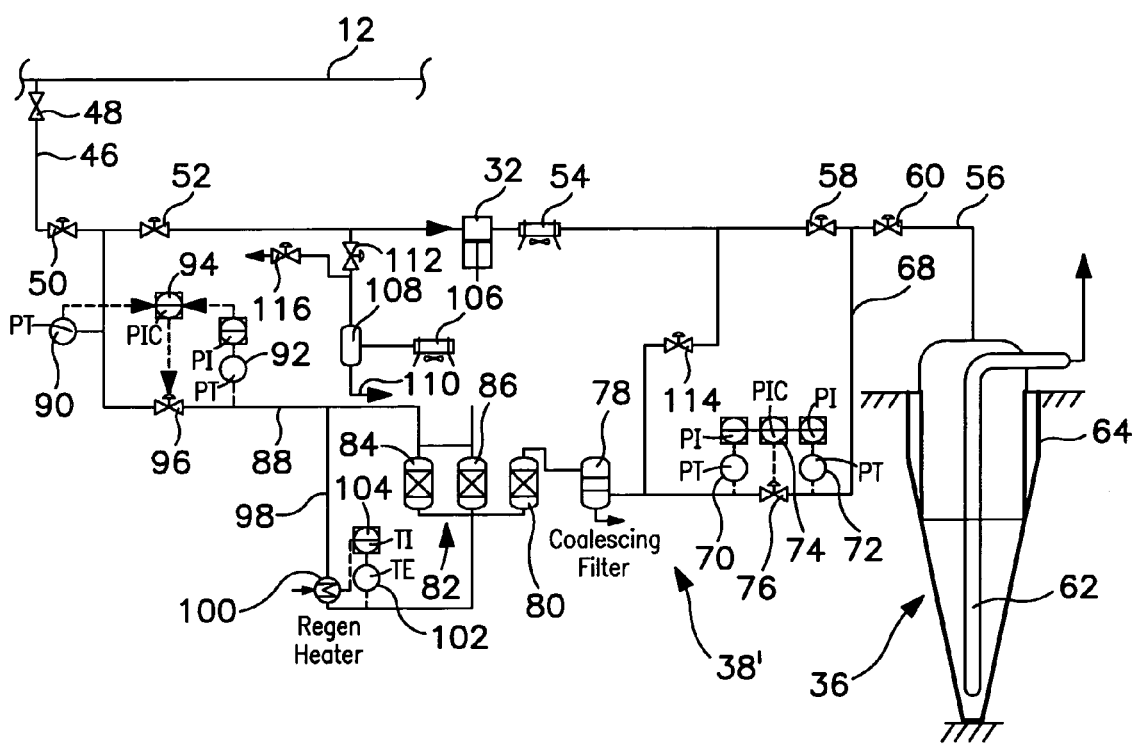
FIG. 3 is a purification system that can be utilized in carrying out a method in accordance with the present invention.

With reference to FIG. 3, hydrogen purification system 38 is illustrated in a form that is capable of purifying gaseous hydrogen stored in salt cavern 36 from such contaminants as carbon dioxide, water vapor and hydrogen sulfide. Though the potential for hydrogen sulfide contamination from storage within salt cavern 36 is not known, it is seen as a safeguard from potential contamination that would result in an expensive loss of product if such contamination were to occur. The same design could be used for hydrogen purification system 38'. As may be appreciated, if hydrogen sulfide contamination were not in issue due to the product purity specification, hydrogen sulfide purification would be eliminated from the purification system.

Gaseous hydrogen stream 30 (shown in FIG. 1) is removed from pipeline 12 through a conduit 46 having an isolation valve 48 to isolate hydrogen purification system 38 from pipeline 12 for maintenance purposes. In the following discussion, the control valves are normally in a closed position, cutting off the flow and can be remotely operated valves which are centrally and electronically controlled.

If hydrogen is to be stored, control valve 50 is set in an open position. A control valve 52 is also set in an open position to allow the gaseous hydrogen stream 30 to be fed to feed compressor 32 and aftercooler 54. Aftercooler 54 is a known device consisting of a heat exchanger utilizing cooling water and a draft fan to remove the heat of compression from stream 30 (shown in FIG. 1). The resultant compressed hydrogen stream 34 (shown in FIG. 1) flows within conduit 56 to salt cavern 36. Control valves 58 and 60 are set in open positions open during this time of storage.

As illustrated, salt cavern 36 is of conventional design having a brine string 62 exhausting into a brine pond and a metal casing held in place by a concrete lining 64.

After storage is complete, the aforementioned valves are returned to their normally closed condition. When production is to be supplemented with hydrogen stored in salt cavern 36, control valve 60 is set in an open position to allow the supply of the hydrogen product stream 10 (shown in FIG. 1) to pipeline 12. The opening of control valve 60 allows crude hydrogen stream 40 (shown in FIG. 1) to flow from salt cavern 36 through conduit 68. Pressure is controlled within conduit 68 by pressure transducers 70 and 72 and a controller 74 that operates proportional control valve 76.

The crude hydrogen stream 40 then enters a coalescing filter 78 of known design in which water is removed. Hydrogen sulfide is removed by a hydrogen sulfide removal bed 80 which can utilize a zinc oxide catalytic adsorbent. In practice, bed 80 is never regenerated. It is simply replaced on a periodic maintenance schedule. The crude hydrogen stream 40 then enters a temperature swing adsorption unit 82 as an intermediate product stream having adsorbent beds 84 and 86 to remove carbon dioxide and water therefrom. The hydrogen product stream 10 (shown in FIG. 1) resulting from the purification of the crude hydrogen stream 40 is then routed through outlet conduit 88. Pressure transducers 90, 92 connected to a controller 94 are used to control pressure within outlet conduit 88 through a proportional control valve 96.

Hydrogen product stream 10 flows through conduit 46 and back to pipeline 12. As can be appreciated during this period of supply, control valve 52 is set in a closed position and control valve 50 is set in an open position.

Adsorption beds 84 and 86 are operated in accordance with a temperature swing adsorption cycle which one bed is online producing the hydrogen product stream while the other bed is an off-line bed and is being regenerated. For regeneration purposes, a regeneration conduit 98 is provided having a regeneration heater 100 which is controlled by a temperature transducer 102 and a controller 104. A subsidiary hydrogen product stream, composed of part of the hydrogen product stream, is introduced to the off-line adsorption bed, either bed 84 or 86.

The high temperature of the subsidiary hydrogen product stream causes desorption of carbon dioxide and water which is discharged from the bed being regenerated as a heated regeneration stream having increased concentrations of the desorbed carbon dioxide and water. Such heated regeneration stream is then cooled within a regeneration cooler 106 which can be a water cooled heat exchanger in which a forced draft is produced by a draft fan. After the cooling of the heated regeneration stream, the resultant cooled stream is then sent to a regeneration separator 108 which is simply a pot to allow water produced by cooling within regeneration cooler 106 to discharge as a stream 110. During regeneration, valve 112 is set in an open position to allow such stream to be compressed by feed compressor 32 and cooled by aftercooler 54. Further, valve 58 is set in a closed position and a valve 114 is set in an open position to allow the resultant cooled, dried stream to combine with crude hydrogen stream flowing in conduit 68 for subsequent carbon dioxide and water removal.

As can be appreciated, the recirculation of the regeneration stream will eventually concentrate impurities within the purification system. In order to avoid this, at specific time periods, valve 112 is set in a closed position and valve 116 is reset in the open position to discharge the heated regeneration stream after having been cooled in regeneration cooler 106. The purging can be on a continual basis as well. Valve 112 could be open and valve 116 could be partially opened. The degree to which valve 116 is open would be chosen to achieve a certain impurity level. A higher percentage of openness would lead to a lower impurity level (fewer impurities), and a lower percentage of openness would lead to a higher impurity level (more impurities).

As may be appreciated, it is possible to use other cycles for regeneration for adsorbent beds. For instance, the adsorbent beds could function on a pressure swing adsorption cycle. Moreover, membrane and cryogenic distillation devices could be used in place of adsorbent systems.

While the present invention has been described with reference to a preferred embodiment, as will be understood by those skilled in the art, numerous changes, omissions and additions can be made without departing from the spirit and the scope of the present invention.

We claim:

1. A method of storing and supplying a gaseous hydrogen product to a pipeline under a product purity specification, having a pre-specifed hydrogen purity and an impurity level of impurities comprising carbon dioxide and water vapor, said method comprising:

compressing a hydrogen steam made up of gaseous hydrogen to form a compressed hydrogen stream;

introducing the compressed hydrogen stream into a salt cavern for storage of the gaseous hydrogen;

recovering a crude hydrogen stream from the salt cavern;

purifying the crude hydrogen stream by sufficiently removing at least the carbon dioxide and the water vapor from the crude hydrogen stream to at least in part produce a hydrogen product steam having the impurity level of the carbon dioxide and water vapor at or below the product purity specification; and supplying the gaseous hydrogen product to the pipeline by introducing said hydrogen product stream into said pipeline.

2. The method of claim 1, wherein:

the gaseous hydrogen is produced by a hydrogen production facility having a hydrogen plant configured to produce the gaseous hydrogen with a higher impurity level of the carbon dioxide and the water vapor than the product purity specification and purification equipment configured to purify the gaseous hydrogen to directly produce the hydrogen product stream and to purify the crude hydrogen stream to produce the hydrogen product stream therefrom; and when demand for the gaseous hydrogen product is below a production capacity of the hydrogen plant, the hydrogen product steam is formed by directly purifying part of the gaseous hydrogen without recovery of the crude hydrogen stream from the salt cavern and utilizing a remaining part of the gaseous hydrogen as the hydrogen steam for compression and storage in the salt cavern; and when demand for the gaseous hydrogen product is above the production capacity of the hydrogen plant, the crude hydrogen stream is recovered from the salt cavern and purified to at least in part produce the product stream.

3. The method of claim 1, wherein:

the hydrogen stream is removed from the pipeline and stored within the salt cavern during periods of low demand for the hydrogen product; and the hydrogen product stream is introduced into the pipeline during periods of high demand for the hydrogen product.

4. The method of claim 1, wherein:

the crude hydrogen stream is purified by also sufficiently removing hydrogen sulfide;

the impurities within the product purity specification comprise the hydrogen sulfide, the water vapor and the carbon dioxide;

water in a liquid state and other contaminants are removed from the crude hydrogen stream within a coalescing filter;

the hydrogen sulfide, the water vapor and the carbon dioxide are removed from the crude hydrogen stream after the coalescing filter by adsorption; and the hydrogen sulfide is removed before the water vapor and the carbon dioxide.

5. The method of claim 4, wherein:

the hydrogen sulfide is removed within a hydrogen sulfide adsorption bed to form an intermediate product stream; and the intermediate product stream is introduced into a system of adsorbent beds configured to remove the carbon dioxide and water in an alternating fashion such that one bed is online producing the hydrogen product stream while another bed is an off-line bed being regenerated through desorption.

6. The method of claim 5, wherein:

the system of adsorbent beds are operated in accordance with a temperature swing adsorption cycle;

a subsidiary hydrogen product stream is divided out of the hydrogen product stream and is heated;

the subsidiary hydrogen product stream is introduced into the off-line adsorbent bed, thereby to produce a regeneration stream containing desorbed impurities;

water is separated from the regeneration stream; and after water separation, the regeneration stream is compressed and recycled back to the coalescing filter 7. The method of claim 1, wherein the hydrogen stream is compressed to about 2200 psig and the hydrogen product stream is reduced in pressure to between about 600 psig and about 800 psig.

8. The method of claim 1, wherein the product purity specification of the hydrogen product stream is about 99.99 percent pure hydrogen containing less than about 100 ppmv nitrogen and argon, less than about 1 ppmv or carbon monoxide and carbon dioxide, less than about 1 ppmv methane, less than about 1 ppmv water, and less than about 1 ppmv hydrogen sulfide.

* * * * *

UNITED STATES PATENT AND TRADEMARK OFFICE
Certificate

Patent No. 7,078,011 B2　　　　　　　　　　　　　　　　　　　　Patented: July 18, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey M. Morrow, Buffalo, NY (US); Marianne Corrao, The Woodlands, TX (US); Steven Hylkema, Tonawanda, NY (US); and Rommel Marquis Oates, Houston, TX (US).

Signed and Sealed this Twenty-fifth Day of May 2010.

STANLEY S. SILVERMAN
*Supervisory Patent Examiner*
Art Unit 1793